United States Patent [19]

Sakano

[11] Patent Number: 4,859,845

[45] Date of Patent: Aug. 22, 1989

[54] OPTICAL ROTARY ENCODER WITH SUB-CODE PATTERNS

[75] Inventor: Tetsuro Sakano, Yamanashi, Japan

[73] Assignee: Fanuc Ltd., Minamitsuru, Japan

[21] Appl. No.: 141,306

[22] PCT Filed: Apr. 15, 1987

[86] PCT No.: PCT/JP87/00240

§ 371 Date: Apr. 15, 1987

§ 102(e) Date: Apr. 15, 1987

[87] PCT Pub. No.: WO87/06338

PCT Pub. Date: Oct. 22, 1987

[30] Foreign Application Priority Data

Apr. 15, 1986 [JP] Japan .................................. 61-86658

[51] Int. Cl.⁴ ............................................. G01D 5/34
[52] U.S. Cl. ......................... 250/231 SE; 250/211 K; 250/237 G
[58] Field of Search .................. 250/211 K, 231 S E, 250/237 G, 237 R, 229; 356/373

[56] References Cited

U.S. PATENT DOCUMENTS

| | | | |
|---|---|---|---|
| 3,128,386 | 4/1964 | Hughes | 250/229 |
| 3,285,123 | 11/1966 | Rantsch et al. | 356/373 |
| 3,859,617 | 1/1975 | Oka et al. | 250/211 K |
| 3,892,961 | 7/1975 | Bachmann | 250/237 R |
| 4,250,380 | 2/1981 | Iyeta | 250/211 K |

Primary Examiner—David C. Nelms
Attorney, Agent, or Firm—Staas & Halsey

[57] ABSTRACT

An optical rotary encoder is provided, which has a code disk formed with an analog code pattern (CP) so as to improve its detection resolution.

The analog code pattern (CP) is continuously formed in the disk circumferentially of the disk, and has its radial width (W) set to a value which varies as a function of the rotational position of the disk, and continuously changes in the circumferential direction. A photoreceptor of the encoder generates a signal proportionate to an amount of light received through the pattern.

30 Claims, 4 Drawing Sheets

OPTICAL ROTARY ENCODER WITH SUB-CODE PATTERNS

BACKGROUND OF THE INVENTION

1. Field of the Invention

The present invention relates to an optical rotary encoder, and more particularly to a rotary encoder having a code disk which is formed with an analog pattern, and having improved detection resolution.

2. Description of the Related Art

Generally, in an optical encoder, a light beam is projected from a photoemitter such as a LED onto a rotary disk formed with a digital code pattern, the disk being composed of glass, for instance. The light beam passes through or is reflected from the digital code pattern, and then passes through a photoreception window to be received by a photoreceptor such as a phototransistor. The received light is converted by the photoreceptor into an electrical signal to generate output pulses, for detection of the rotational speed and the rotational position of the disk.

A conventional optical rotary encoder, using the above-mentioned type of digital code pattern for detection, has a limited resolution because of the usage of the digital code pattern. That is, it is difficult to obtain a high resolution merely by narrowing the pattern width and the pattern interval of the minimum unit of division of the code pattern, i.e., by the use of a minute code pattern. Further, even if the minute pattern can be obtained, escape and diffraction of the light beam or the like occur, which adversely affect the resolution of the encoder.

SUMMARY OF THE INVENTION

The object of the present invention is to form an analog code pattern on a rotary encoder, to thereby provide a rotary encoder having high resolution which cannot be attained by the above-mentioned conventional digital code pattern.

To achieve the above-mentioned object, in a rotary encoder arranged to receive light from a photoemitter by a photoreceptor through a code pattern formed in a disk, to thereby detect a value of a parameter associated with rotation of the disk, according to the present invention, the code pattern consists of an analog code pattern, which is continuously formed in the disk in the direction circumferentially of the disk. The radial width of the analog code pattern is set to a value which is determined as a function of the rotational position of the disk. The photoreceptor is adapted to generate a signal proportional to an amount of light received through the analog code pattern.

As mentioned above, according to the present invention, the disk is formed with the analog code pattern the width of which continuously changes as a function of the rotational position of the disk. As a result, the output from the photoreceptor accurately follows the code pattern, and the rotary encoder obtains a high resolution.

DETAILED DESCRIPTION OF THE PREFERRED EMBODIMENTS

Figure 1:
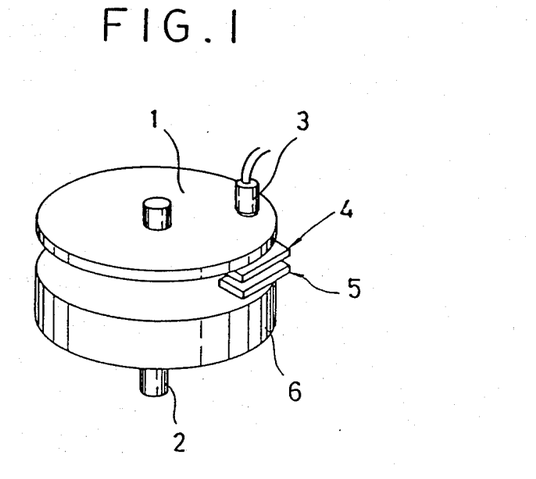
FIG. 1 is a schematic perspective view of a rotary encoder according to a first embodiment of the present invention.

FIG. 1 shows a rotary encoder of a first embodiment of the present invention, which is substantially the same in basic construction as a conventional optical rotary encoder of transmission type. That is, reference numeral 1 designates a code disk composed of glass, for instance, which is fixed to a shaft 2 coupled to an object to be detected such as a motor shaft, or a drive shaft of a robot, etc. The code disk 1 is formed with a code pattern mentioned later, whch is formed through the disk. Reference numeral 3 denotes a photoemitter consisting of a LED, for instance, and disposed on one side of the disk 1, and reference 4 is a fixed plate disposed on another side of the disk 1 and having a photoreception window 4a (FIG. 2) through which parallel light beams passing through the code pattern of the code disk 1 pass. Numeral 5 designates a photoreceptor disposed at a location at which the photoreceptor 5 is capable of receiving the light beams through the photoreception window 4a, the photoreceptor 5 having a photoreception element consisting of a phototransistor, for instance. The photoemitter 3, the fixed plate 4 and the photoreceptor 5 are fixedly supported at the above-mentioned locations by a stationary section 6, so that the light beam projected from the photoemitter 3 passes through the code pattern of the code disk 1, and passes through the photoreception window 4a of the fixed plate 4, to be received by the photoreceptor 5.

Figure 2:
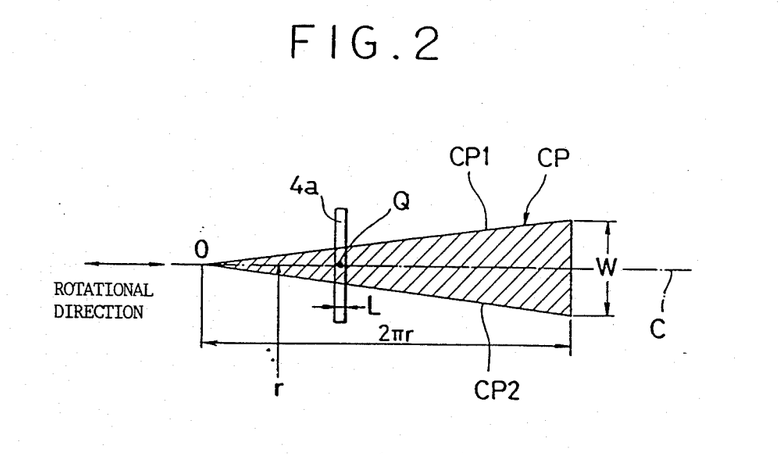
FIG. 2 is a view showing, in relation to a photoreception window and in an expanded state, an analog code pattern formed in the disk of FIG. 1.

FIG. 2 shows the code pattern formed in the code disk 1 of this embodiment, in an expanded state. The pattern CP is formed in such a manner that opposite edges CP1 and CP2 defining the pattern therebetween are disposed symmetrically with respect to an imaginary circle c in the radial direction and the distance between these edges CP1, CP2, i.e., the pattern width w linearly increases in the circumferential direction, the imaginary circle c being disposed coaxially with the code disk 1 and having a radius of r. In other words, the pattern CP, as a whole, is formed into a ring shape. The photoemitter 3 and the fixed plate 4 are disposed at locations where the imaginary circle c, having a radius of r and corresponding to the centerline of the code pattern CP, is aligned with the center Q, and the circle c is aligned with the center of the photoreception window 4a of the fixed plate 4. As a result, the light beam from the photoemitter 3 passes through the centerline of the code pattern CP and through the center of the photoreception window 4a. Therefore, an amount of light received by the photoreceptor 5 is in proportion to an effective photoreception area which is equal to the product of the pattern width W and the width L of the photoreception window 4a, i.e., the transmission area W×L. Accordingly, in case that the origin O of the pattern CP is taken as the starting point, the effective photoreception area, corresponding to the photoreception amount per unit time, linearly increases from zero as the disk 1 is rotated, and the effective photoreception area becomes substantially zero again when the code disk 1 has completed one revolution to assume its rotational position at which the transmission light beam is aligned to the origin O. In this manner, the effective photoreception area of the photoreceptor 5 is arranged to linearly increase with rotation of the disk 1. Thus, a linear increase also occurs in a level of an output signal supplied from the photoreceptor 5 for photoelectric conversion. In view of this, the output of the photoreceptor 5 is converted into a digital signal in an A/D converter so as to detect the rotational position of the code disk 1, i.e., the rotational position of the object coupled to the shaft 2. The rotational position, in this case, can be detected with high accuracy by the use of the A/D converter having high resolution.

Figure 3:
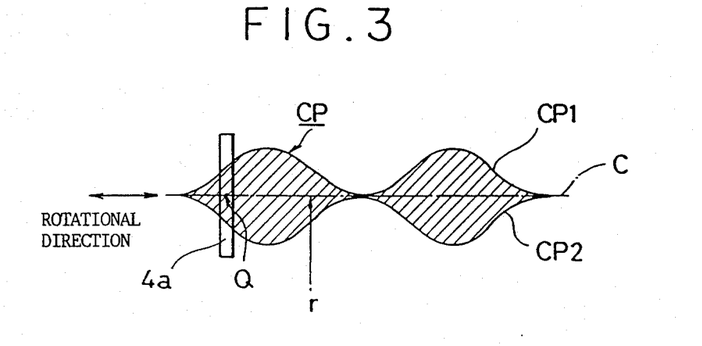
FIG. 3 is a view, similar to FIG. 2, showing a code pattern according to a second embodiment of the present invention.

FIG. 3 shows, in an expanded state, an analog code pattern CP of a second embodiment of the present invention. The pattern CP is defined as a ring shape by edges CP1 and CP2 each consisting of a sinusoidal wave, which edges are opposite in phase to each other. These edges CP1 and CP2 are symmetric to each other with respect to an imaginary circle c, as in the case of FIG. 2. Further, each sinusoidal wave is so arranged that a predetermined number of periods (two periods in FIG. 3) thereof corresponds to the entire circumference of the imaginary circle c and that of the disk 1.

In the encoder of this embodiment, the effective photoreception area of the photoreceptor 5 varies sinusoidally in accordance with the code pattern CP. Accordingly, the output signal from the photoreceptor 5 varies in magnitude as a sinusoidal function of the rotational position of the disk, and is hence utilized for detection of the rotational position of the code disk 1.

As mentioned above, according to the encoder having the disk 1 formed with the code pattern CP which is exemplarily shown in FIGS. 2 and 3, the magnitude of the output signal of the photoreceptor 5 always corresponds to the rotational position of the disk. Thus, for instance, the signal from the photoreceptor 5 is subjected to A/D conversion, to be utilized for highly accurate detection of the rotational position.

Figure 4:
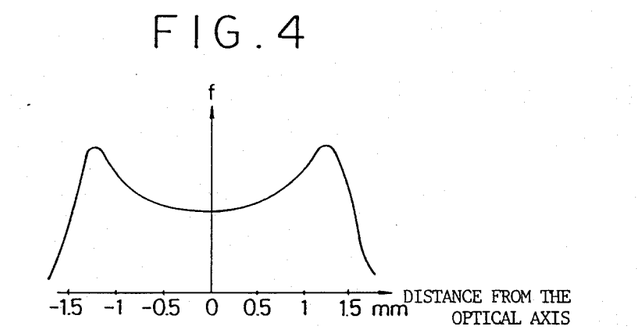
FIG. 4 is a view showing, by way of example, a luminous intensity distribution of a LED.
Figure 5:
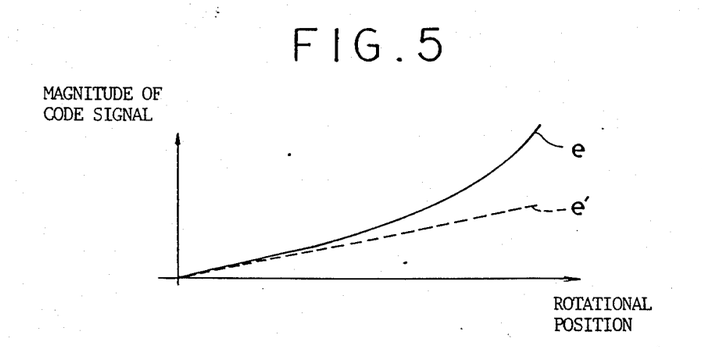
FIG. 5 is a view showing an output from a photoreceptor in the case of using an increased maximum width of the code pattern in the first embodiment, together with an ideal output of the receptor.
Figure 6:
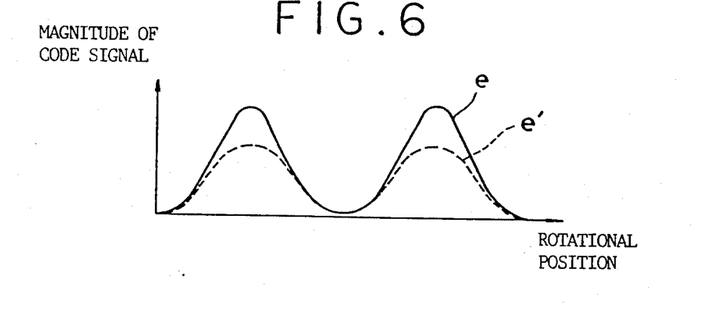
FIG. 6 is a view, similar to FIG. 5, but relating to the second embodiment.

However, in case that the luminous intensity distribution of light projected from the photoemitter 3 is non-uniform, the maximum width w of the code pattern CP cannot be increased for execution of accurate detection. The reason will be further explained below. FIG. 4 exemplarily shows a measurement result of the luminous intensity distribution of a LED having a diameter of 4 mm, in which luminous intensity and the distance from the optical axis Q are plotted in ordinate and abscissa, respectively. As shown in FIG. 4, the luminous intensity f increases and then suddenly decreases as the distance from the optical axis increases. As a result, if the maximum width w of the code pattern CP is enlarged within such luminous intensity increasing section, i.e., if the maximum width is set to a value of about 1.5 mm, for instance, the intensity of the incident light beam to the photoreceptor 5 at the circumferential portions thereof becomes larger than that at the central portion of the receptor 5. In this connection, if the code pattern of FIG. 2 having the pattern width linearly increasing is employed, an output from the photoreceptor 5 becomes nonlinear as shown in FIG. 5, which is different from an ideal linear output e'. Also, if the code pattern of FIG. 3 defined by sinusoidal waves is employed, the resultant output is deformed as shown in FIG. 6, when compared with an ideal sinusoidal output e'.

Accordingly, to obtain a linear output, the maximum width w of the code pattern CP cannot be too large in case that the distribution of light from the photoemitter 3 is non-uniform. On the other hand, if the maximum width w of the code pattern CP is set to too a small value, both of the resolution and the S/N ratio become incorrect because the output signal of the photoreceptor 5 becomes too small, and an amount of change in the pattern width per unit of rotational angle becomes too small. Moreover, dust and dirt on the code pattern CP are likely to have an adverse affect.

Figure 7:
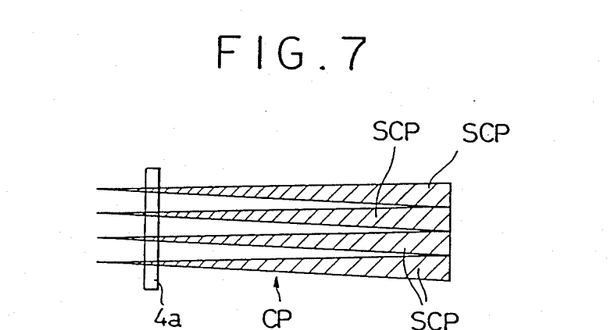
FIG. 7 is a view showing a code pattern according to a third embodiment of the present invention.
Figure 8:
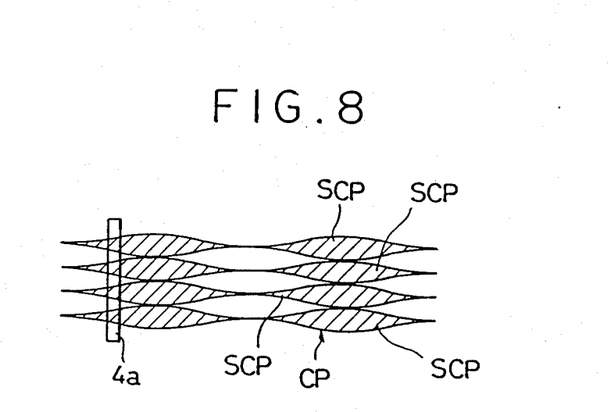
FIG. 8 is a view showing a code pattern of a fourth embodiment of the present invention.

FIGS. 7 and 8 show code patterns of third and fourth embodiments of the present invention, respectively. These patterns CP are respectively formed by a plurality of sub-code patterns each having the maximum pattern width set to a small value, so as to compensate for the affection due to non-uniformity in the intensity distribution of light from a photoemitter 3, to thereby obviate degradation in the detecting resolution and the S/N ratio caused by the above-mentioned reasons.

The code pattern CP of FIG. 7 is formed by four sub-code patterns SCP which are in phase to each other. Each of the sub-code patterns has a pattern width linearly increasing in the rotational direction of the disk as shown in FIG. 2 and has the maximum pattern width w which is about one-fourth that of the pattern of FIG. 2. The code pattern CP shown in FIG. 8 is formed by four sub-code patterns SCP each of which is defined by two sinusoidal curves of a type shown in FIG. 3 and has its small maximum pattern width w. That is, the maximum amplitude of the sinusoidal wave is set to a small value. In the encoders of the third and fourth embodiments, light beams passing though these plural sub-code patterns SCP are received by a photoreceptor 5 through a photoreception window 4a.

An explanation will now be given as to why the non-uniformity in optical distribution can be compensated for and why a linear output signal proportionate to the code pattern CP can be obtained, by referring to the code patterns shown in FIGS. 7 and 8.

Figure 9:
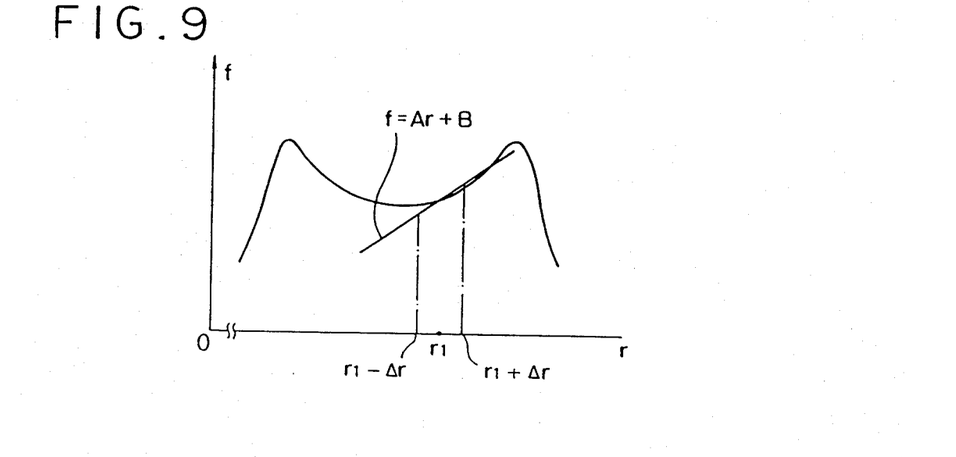
FIG. 9 is a view explaining calculation of an amount of light with respect to a minute section.

As shown in FIG. 9, the intensity distribution of light from the photoemitter 3 can be approximated by a straight line $f = Ar + B$ (where A and B are constants) with respect to a minute section which is located in the vicinity of a certain point located at a location apart from the center O of a code disk 1 by a distance or $r_1$. Considering the minute section around the point apart from the center of the code disk 1 by the distance (radius) of $r_1$, the luminous intensity f increases at a large-radius side of the minute section, and decreases at a small-radius side, respectively. As mentioned latter, an amount of light supplied to the entire minute section is approximately in proportion to a value which is equal to the product of the luminous intensity f at the point corresponding to the radius of $r_1$ and the width $2\Delta r$ of the minute section. In other words, the amount of light supplied to the entire minute section is in proportion to the width $2\Delta r$ of the same section. In this connection, the maximum width w of each sub-code pattern SCP, in the present invention, is set to a value which is smaller than the width of such a region where the above-mentioned linear approximation is applicable. As a result, at an arbitrary rotational position of the disk 1, the amount of light passing through the sub-code patterns SCP and then received by the photoreceptor 5 becomes proportional to the product of the width of each sub-code pattern SCP at such rotational position and the number of sub-code patterns forming the code pattern CP.

In this respect, a mathematical explanation will be given. In FIG. 9, the amount of light received by the photoreceptor 5 at the minute section $2\Delta r$, which has its center located at the radius of $r_1$, is in proportion to a value obtained by integrating the approximate straight line $f = Ar + B$ from one end $(r_1 - \Delta r)$ of the minute section to another end $(r_1 + \Delta r)$. Further, the resultant output V from the photoreceptor 5 is proportionate to this integration value. Accordingly, the output V of the photoreceptor 5 is $$V = K \int_{r_1-\Delta r}^{r_1+\Delta r} f\, dr = 2K(Ar_1 + B)\Delta r \tag{1}$$

where $K$, $A$, and $B$ constants.

Figure 10:
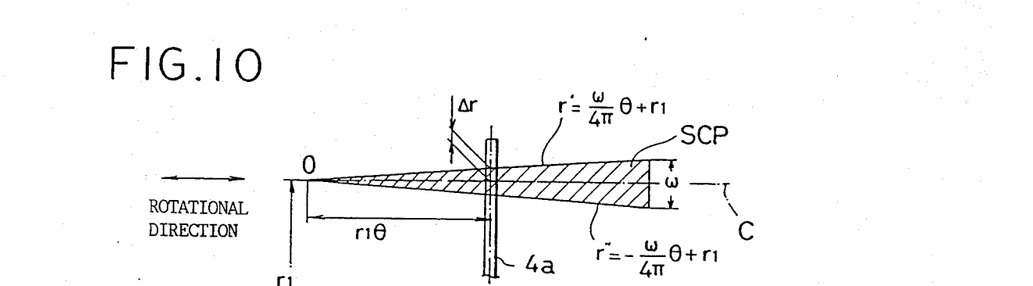
FIG. 10 is a view explaining calculation of an output from the photoreceptor of the third embodiment.

As for the sub-code pattern SCP of FIG. 7, assuming that the radius of an imaginary circle c passing through the centerline of the sub-code pattern SCP is $r_1$, the maximum pattern width is w. The rotational angle of the code disk 1 corresponding to the distance between the origin O of the code pattern and the center of the photoreception window 4a is $\theta$, respectively, as shown in FIG. 10. An outer edge r' of the sub-code pattern SCP with respect to the imaginary circle c is represented as $$r' = (w/4\pi)\theta + r_1 \tag{2}$$

and an inner edge r'' of the sub-code pattern SCP is represented as $$r'' = -(w/4\pi)\theta + r_1 \tag{3},$$

respectively.

In this case, as apparent from the equations (2) and (3), the respective half widths $\Delta r$ of the minute section around the radius of $r_1$ is obtained by an equation of $\Delta r = (w/4\pi)\theta$. Hence, referring to the equation (1), the output V of the photoreceptor 5 is obtained by the following equation:

$$V = (Kw/2\pi)(Ar_1 + B)\theta \tag{4}$$

In the equation (4), K is a constant, w is the maximum width (constant) of the sub-code pattern, A and B are constants, and $r_1$ is the radius (constant) of a circle passing through the centerline of the sub-code pattern SCP. Accordingly, the output V of the photoreceptor 5 is proportional to the rotation angle $\theta$ of the code disk 1, as apparent from the equation (4). The above relationship is applicable even in the case of using a plurality of sub-code patterns having the same construction to each other, as shown in FIG. 7. In this case, the resultant output of the photoreceptor 5, which receives light beams passing through the respective patterns is proportionate to the rotational angle $\theta$ of the disk 1, and becomes larger in magnitude as the number of the sub-code patterns increases. As a result, the output approximately equals the ideal output e' shown in FIG. 5.

Figure 11:
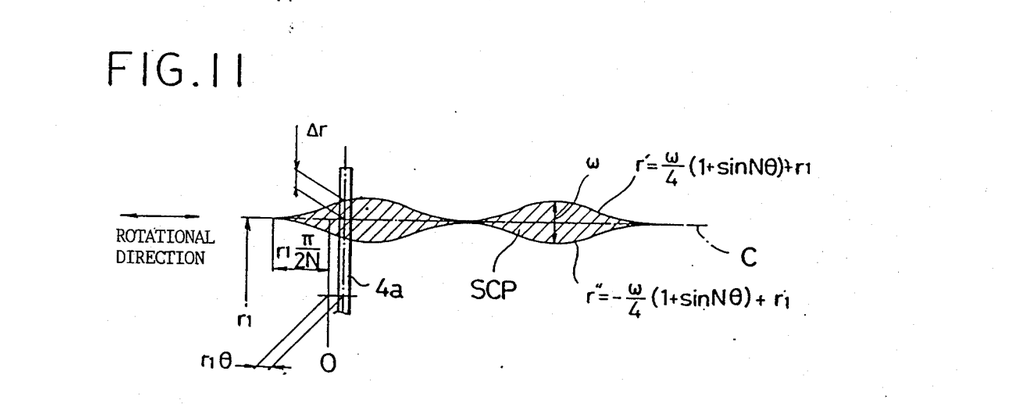
FIG. 11 is a view, similar to FIG. 10, but relating to the fourth embodiment.

Next, the sub-code pattern SCP which is defined by two sinusoidal curves, is considered. As shown in FIG. 11, assuming that the radius of a circle c passing through the centerline of the sub-code pattern SCP is $r_1$, the rotation angle corresponding to the distance between the origin of the code pattern and the centerline of the photoreception window 4a is $\theta$, and the maximum width of the sub-code pattern SCP is w, respectively. An outer edge r' of the sub-code pattern with respect to the circle c is represented as $$r' = (w/4)(1 + \sin N\theta) + r_1 \tag{5}$$

and an inner edge r'' is represented as $$r'' = -(w/4)(1 + \sin N\theta) + r_1 \tag{6},$$

where N represents the number of periods of the sinusoidal curve, which number corresponds to one revolution (the entire circumferene) of the code disk 1.

In this instance, the half width $\Delta r$ of the minute section around the radius $r_1$ is obtained from the equations (5) and (6) as follows:

$$\Delta r = (w/4)(1 + \sin N\theta) \tag{7}$$

By substituting the equation (7) for the equation (1), the output V from the photoreceptor 5 is obtained as follows:

$$\begin{aligned}V &= 2K(Ar_1 + B)(w/4)(1 + \sin N\theta) \\ &= (Kw/2)(Ar_1 + B) + (Kw/2)(Ar_1 + B)\sin N\theta.\end{aligned} \tag{8}$$

In the equation (8), all the parameters in the right hand first term are constants and do not depend on the rotation angle $\theta$. Therefore, the first term has a constant value, which can be eliminated by utilizing an offset function of a compensating circuit. Further, the second term is in proportion to a sinusoidal function of the rotation angle $\theta$.

Accordingly, the output from the photoreceptor 5 follows the sub-code pattern SCP, and becomes approximately equal to the ideal output e' of FIG. 6. The output from the photoreceptor 5, which receives light beams passing through the code pattern C consisting of a plurality of sub-code patterns SCP, varies as a sinusoidal function of the rotation angle $\theta$ and has a large value depending on the number of the sub-code patterns.

As explained above, the adverse affects due to non-uniformity in the intensity distribution of light from the photoemitter which consists of a LED, for instance, is eliminated by the use of the sub-code pattern having its maximum width w. The reduction in change in the output from the photoreceptor 5 resulting from the reduced pattern width is compensated for by the use of the plural sub-code patterns, to thereby improve the S/N ratio. Also, the adverse affects due to dust and dirt on the code pattern CP are eliminated. The output of the photoreceptor 5 thus obtained by means of the above-mentioned code pattern CP is an analog signal which continuously changes with rotation of the code disk 1. Accordingly, the rotational position of the code disk 1 is detected with high resolution by the use of an A/D converter.

Although, in the above embodiment, the rotary encoder is arranged to generate the output indicative of the rotational position, a signal indicative of the rotation speed may be generated. Further, the present invention may be applied to a reflection type encoder although the application to the transmission type encoder has been explained in the above embodiment.

I claim:

1. An optical rotary encoder having a photoreceptor for receiving light beams from a photoemitter through a code pattern formed in a disk for detecting a value of a parameter associated with rotation of the disk, the optical rotary encoder comprising:
an analog code pattern which is formed annularly in the disk in a direction circumferentially of the disk;
p1 said analog code pattern including a plurality of sub-code patterns, said plurality of sub-code pattern being respectively formed coaxially with the disk and along circular centerlines having different radius to each other, and being arranged in phase with each other, said photoreceptor generating the sum of signals optically received through said plurality of code patterns,
wherein a maximum width of each of said sub-code patterns is set to a value which is smaller than a region of a linear approximation of an intensity distribution of light projected from said photoemitter.

2. An optical rotary encoder according to claim 1, wherein each of said sub-code patterns is formed into a shape which is radially symmetric with respect to an associated one of said circular centerlines.

3. An optical rotary encoder according to claim 2, wherein each of said sub-code patterns is formed into a shape having a radial width which linearly increases along said associated one imaginary circle.

4. An optical rotary encoder according to claim 2, wherein each of said sub-code patterns is formed into a shape having a radial width which linearly increases along its corresponding circular centerline and in accordance with a predetermined function of the rotation angle of the disk.

5. An optical rotary encoder according to claim 2, wherein each of said sub-code patterns is formed into a shape having a radial width which changes along its corresponding circular centerline and in accordance with a predetermined function of the rotation angle of the disk, and wherein said predetermined function is a sinusoidal function.

6. An optical rotary encoder according to claim 1, wherein said parameter associated with rotation of the disk is a rotational position.

7. An optical rotary encoder according to claim 1, further including a photoreception window interposed between the disk and said photoreceptor, wherein said photoreception window is arranged so that its centerline is aligned with the circular centerline of said analog code pattern.

8. An optical encoder according to claim 1, wherein said parameter associated with rotation of the disk is a rotational position.

9. An optical rotary encoder according to claim 1, further including a photoreception window interposed between the disk and said photoreceptor, wherein a centerline of said photoreception window is aligned with a circular centerline of said analog code pattern.

10. An optical rotary encoder according to claim 8, further including a photoreception window interposed between the disk and said photoreceptor, wherein a centerline of said photoreception window is aligned with a circular centerline of said analog code pattern.

11. A rotary encoder having a photoreceptor for receiving light beams from a photoemitter through a code pattern formed in a disk, for detecting a value of a parameter associated with rotation of the disk, the rotary encoder comprising:
an analog code pattern which is formed annularly in the disk in a direction circumferentially of the disk, and having a radial width varying as a function of a rotational position of the disk, said width continuously changing in a circumferential direction, a maximum value of said width being set to a value which is smaller than a region of light projected from said photoemitter; and
said photoreceptor generating a signal which is in proportion to an amount of light supplied thereto through said analog code pattern.

12. An optical rotary encoder according to claim 11, wherein said analog code pattern is symmetrically shaped in a radial direction about a circular centerline arranged coaxially with the disk.

13. An optical rotary encoder according to claim 11, wherein said analog code pattern has a radial width which linearly increases along said circular centerline.

14. An optical rotary encoder according to claim 12, wherein said analog code pattern has a radial width which changes along said circular centerline and in accordance with a predetermined function of a rotation angle of the disk.

15. An optical rotary encoder according to claim 14, wherein said predetermined function is a sinusoidal function.

16. An optical rotary encoder according to claim 11, wherein said analog code pattern comprises a plurality of sub-code patterns, said plurality of sub-code patterns being respectively formed coaxially with the disk and along circular centerlines having a different radius to each other, and each sub-code pattern being arranged in phase with each other, said photoreceptor generating the sum of signals optically received through said plurality of sub-code patterns.

17. An optical rotary encoder according to claim 16, wherein a maximum width of each of said sub-code patterns is set to a value which is smaller than of a region of a linear approximation of an intensity distribution of light projected from said photoemitter.

18. An optical rotary encoder according to claim 16, wherein each of said plurality of sub-code patterns is radially symmetrically shaped with respect to an associated one of said circular centerlines.

19. An optical rotary encoder according to claim 16, wherein each of said plurality of sub-code patterns has a radial width which linearly increases along each associated circular centerline and in accordance with a predetermined function of the rotation angle of the disk.

20. An optical rotary encoder according to claim 18, wherein each of said plurality of sub-code patterns has a radial width which linearly increases along each associated circular centerline and in accordance with a predetermined function of the rotation angle of the disk.

21. An optical rotary encoder according to claim 18, wherein each of said plurality of sub-code patterns has a radial width which changes along each associated circular centerline and in accordance with a predetermined function of the rotation angle of the disk, and wherein each predetermined function is a sinusoidal function.

22. An optical rotary encoder according to claim 12, further including a photoreception window interposed between the disk and said photoreceptor, wherein a centerline of said photoreception window is aligned with a circular centerline of said analog code pattern.

23. An optical rotary encoder according to claim 13, further including a photoreception window interposed between the disk and said photoreceptor, wherein a centerline of said photoreception window is aligned with a circular centerline of said analog code pattern.

24. An optical rotary encoder according to claim 14, further including a photoreception window interposed between the disk and said photoreceptor, wherein a centerline of said photoreception window is aligned with a circular centerline of said analog code pattern.

25. An optical rotary encoder according to claim 15, further including a photoreception window interposed between the disk and said photoreceptor, wherein a centerline of said photoreception window is aligned with a circular centerline of said analog code pattern.

26. An optical rotary encoder according to claim 16, further including a photoreception window interposed between the disk and said photoreceptor, wherein a centerline of said photoreception window is aligned with a circular centerline of said analog code pattern.

27. An optical rotary encoder according to claim 17, further including a photoreception window interposed between the disk and said photoreceptor, wherein a centerline of said photoreception window is aligned with a circular centerline of said analog code pattern.

28. An optical rotary encoder according to claim 18, further including a photoreception window interposed between the disk and said photoreceptor, wherein a centerline of said photoreception window is aligned with a circular centerline of said analog code pattern.

29. An optical rotary encoder according to claim 19, further including a photoreception window interposed between the disk and said photoreceptor, wherein a centerline of said photoreception window is aligned with a circular centerline of said analog code pattern.

30. An optical rotary encoder according to claim 20, further including a photoreception window interposed between the disk and said photoreceptor, wherein a centerline of said photoreception window is aligned with a circular centerline of said analog code pattern.

* * * * *

UNITED STATES PATENT AND TRADEMARK OFFICE
CERTIFICATE OF CORRECTION

PATENT NO. : 4,859,845

DATED : August 22, 1989

INVENTOR(S) : Tetsuro Sakano

It is certified that error appears in the above-identified patent and that said Letters Patent is hereby corrected as shown below:

On the title page, item [86] "Apr. 15, 1987" (both occurrences) should be --December 15, 1987--

Col. 7, line 20, delete "pl".

Signed and Sealed this

Twenty-fourth Day of July, 1990

*Attest:*

HARRY F. MANBECK, JR.

*Attesting Officer*     *Commissioner of Patents and Trademarks*